Patented July 19, 1927.

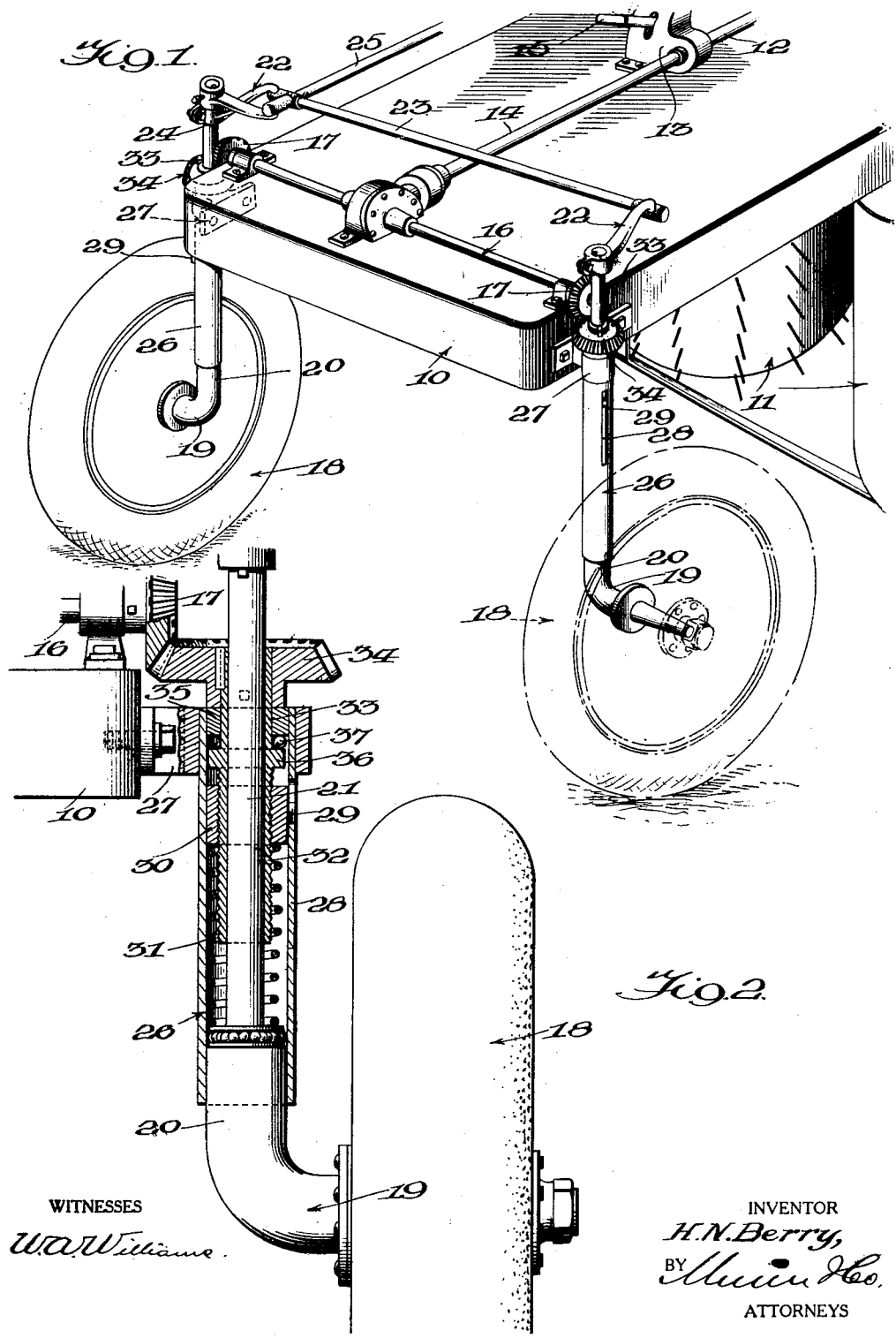

1,636,620

UNITED STATES PATENT OFFICE.

HIRAM NEWTON BERRY, OF GREENVILLE, MISSISSIPPI, ASSIGNOR OF ONE-THIRD TO HUGH A. GAMBLE, OF GREENVILLE, MISSISSIPPI.

VEHICLE LEVELING DEVICE.

Original application filed May 23, 1925, Serial No. 32,986. Divided and this application filed January 14, 1926. Serial No. 81,340.

My present invention relates to vehicle leveling devices and especially such a device which while capable of general application is particularly useful in connection with cotton picking machines, in order to permit of adjustment of the main frame with respect to the ground, whereby the machine may be operated with equal effectiveness and efficiency in connection with high and low cotton plants.

The primary object of my present invention is the provision of a vehicle leveling apparatus capable of effective and efficient employment in connection with my improved cotton picking apparatus as included in my copending applications, Serial Nos. 621,835 and 716,456, respectively filed Nov. 28, 1923 and May 28, 1924, my present application being a division of my application No. 32,986, filed May 23, 1925.

It is a known fact that growing cotton greatly varies in height not only as between the various varieties, but also due to soil conditions and to climate in different localities, and it is for this reason that my invention proposes a leveling device by means of which the frame of the machine may be raised and lowered in the field, both easily and speedily, without necessity of stopping the machine for this purpose.

In the accompanying drawing which illustrates my present invention and forms a part of this specification:

Figure 1 is a perspective view showing certain portions of the machine including a part of the frame and illustrating the frame adjusting means proposed by my invention in connection with the front wheel supports, and, Figure 2 is an enlarged vertical transverse section through certain portions of the adjusting means shown in Figure 1.

Referring now to these figures, and particularly to Figures 1 and 2, I have shown certain portions of the frame of my improved construction including the platform 10, which it is desired to elevate more or less with respect to the ground. I have also shown certain connections including a driven shaft 12, which may be the crank shaft of the motor used to propel the machine or a shaft suitably geared to the crank shaft. This shaft 12 is indicated as leading to a gear or clutch box 13 which controls transmission of power from the shaft 12 to a forwardly projecting shaft 14, a lever 15 affording manual means of connecting and disconnecting said shafts 12 and 14. At its forward end shaft 14 drives a forward transverse shaft 16, the latter being beveled gears 17 at its opposite ends projecting slightly beyond the sides of the platform 10 as plainly seen by comparison of Figures 1 and 2.

The wheels 18 are supported upon the lower angularly outstanding ends 19 of wheel supporting uprights 20 whose upper reduced stems 21 project at their upper ends above the platform 10 and are connected by steering arms 22 and a drag link 23, one of the stems having a steering arm 24 connected to a steering rod 25.

The wheel supporting uprights have bearing in the lower ends of bearing tubes 26, each bearing tube being securely and permanently mounted at its upper end within a bracket 27 attached to the side of the platform, and each tube further having a vertical slot 28 at one side to receive the outstanding lug 29 of an internally threaded collar 30 slidably mounted within the tube and forming a bearing for the upper end of a coiled spring 31 within the tube 26, the lower end of which spring bears against the annular upwardly facing shoulder of the wheel supporting upright at the lower end of stem 21.

The collar 30 engages the lower threaded portion 32 of a sleeve 33 having bearing upon and around the stem 21 and having at its upper end above the upper end of the tube 26 a bevel gear 34, engaging one of the beveled gears 17 of the cross shaft 16. At its upper end the tube 26 has an inner annular rib 35 around the sleeve 33 and it will be noted that the latter has a somewhat similar though external rib 36 below and opposing rib 35 with interposed anti-friction members 37.

It is thus obvious that the support of the vehicle is thus sustained at all times through the spring 31 and that upon rotation of the sleeve 33 in one direction, the platform 10 will be raised by virtue of downward pressure against the collar 30 while upon rotation of the sleeve in the opposite direction the platform will be permitted to lower. Collar 30 cannot rotate and thus when sleeve 32 is rotated it must move up or down depending upon the direction of such rotation. It is obvious that through the mechanism described the platform 10 may be raised and lowered in the field by simply manipulating the control of the driving connections through the hand lever 15. It is also obvious that the construction described may be applied with equal facility and is so applied in use, to the rear wheel, the latter being driven by sprocket chains with sprocket wheels attached directly to the rear wheels.

I claim:—

1. In an apparatus of the character described, a frame, wheel supporting uprights having vertically adjustable connection with the frame at their upper portions and having lower angular extensions, wheels rotatable on said extensions, power actuated rotatable members on each upright with respect to which the latter is rotatable, and a non-rotatable member around each upright and shiftable lengthwise thereof, having threaded connection with the said power actuated rotatable member, and a spring compressed between a portion of each upright and of said non-rotatable member thereof.

2. In an apparatus of the character described, a supporting frame, wheel supporting uprights having lower angular extensions, wheels rotatable on said extensions, a supporting tube for each upright in rigid connection with the frame, a rotatable sleeve on each upright depending within the tube thereof, power actuated manually controlled connections for rotating the sleeves, a collar threaded on each sleeve having a slidable non-rotatable connection within the respective tube, and a spring around each upright, compressed between a portion thereof and said collar.

3. In an apparatus of the character described, a supporting frame, wheel supporting uprights having lower angular outstanding ends and upwardly projecting reduced stems, steering connections engaging the upper ends of said stems, wheels rotatable on said angular lower ends, upright tubes secured to and depending from the frame and through which said stems project, sleeves rotatable on said stems and having threaded lower portions and upper gears, connections for rotating said gears including manual controlling means, a non-rotatable collar within each tube threaded on the sleeve and a spring in each tube between the collar and a shoulder of the respective upright at the lower end of its stem.

HIRAM N. BERRY.